Jan. 6, 1953  A. E. LARSEN  2,624,416
AUXILIARY POWER TAKE-OFF FOR TRACTORS
Filed Sept. 21, 1949  2 SHEETS—SHEET 1

Witness
Edward P. Seely

Inventor
Alfred E. Larsen
by M. Talbert Dick
Attorney

Jan. 6, 1953 — A. E. LARSEN — 2,624,416
AUXILIARY POWER TAKE-OFF FOR TRACTORS
Filed Sept. 21, 1949 — 2 SHEETS—SHEET 2
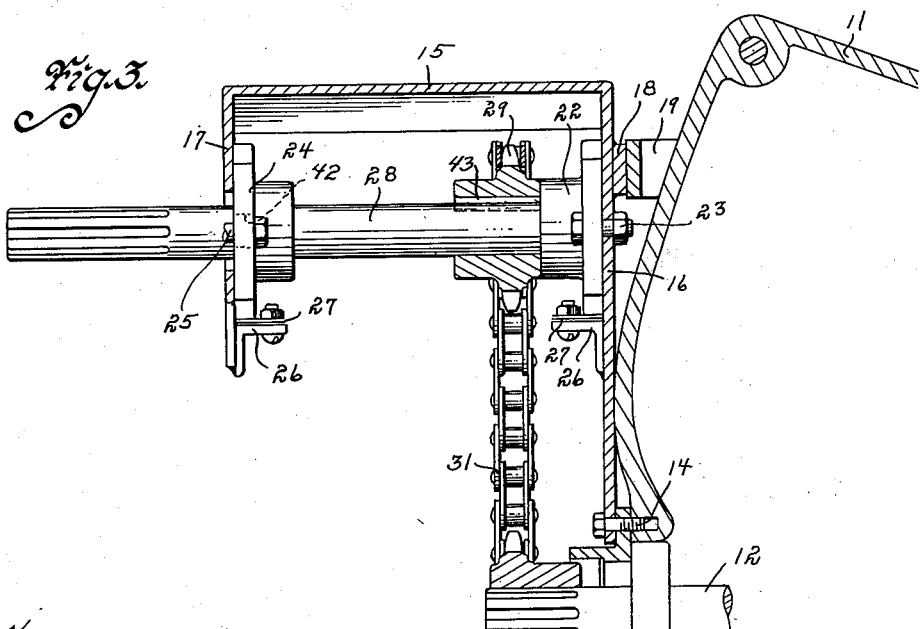
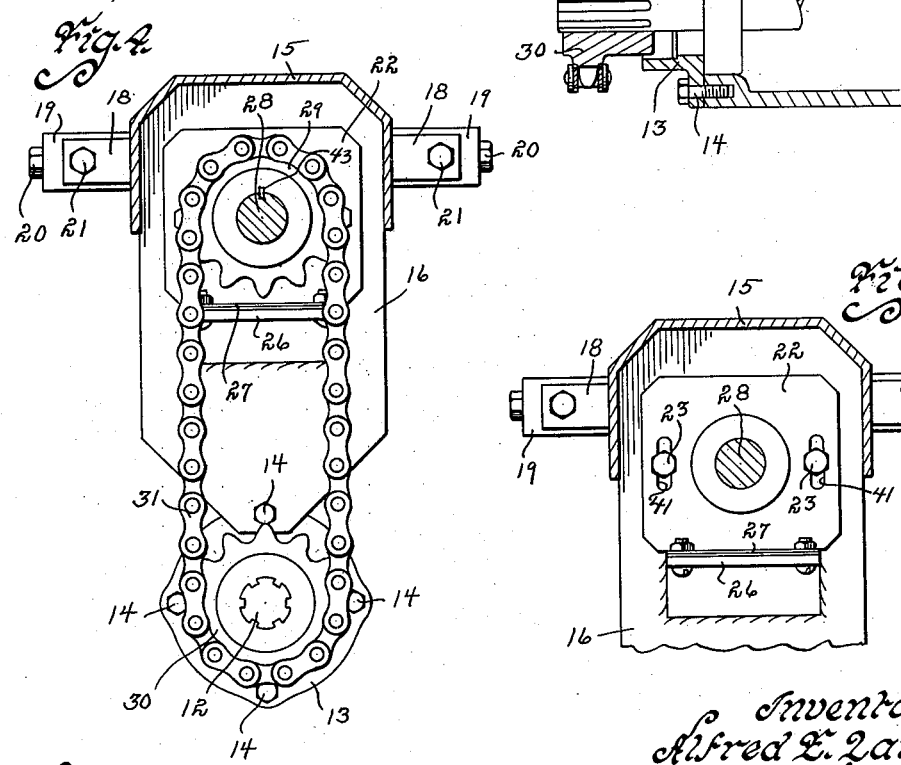
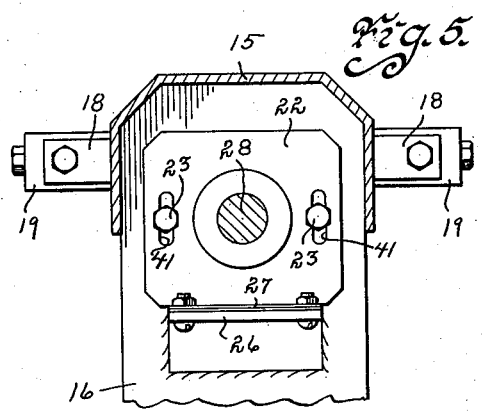
Inventor
Alfred E. Larsen
by M. Talbert Dick
Attorney
Witness
Edward P. Selley Patented Jan. 6, 1953

2,624,416

UNITED STATES PATENT OFFICE 2,624,416

AUXILIARY POWER TAKE-OFF FOR TRACTORS

Alfred E. Larsen, Audubon, Iowa

Application September 21, 1949, Serial No. 116,885

3 Claims. (Cl. 180—53)

1

In many farm tractors the power take-off for the farm implements is at the rear center bottom of the rear transmission. This point is even with or below the plane of the draw bar at points where the draw bar is attached to the tractor. The difficulty is that the power take-off interferes with the lowering and raising of the draw bar or else limits the attaching points of the draw bar to the tractor. This problem is especially present when the tractor is used for powering and moving a corn picker. Furthermore, the pull of the draw bar may not be proper as to the point of gravity, thereby making the equipment of poor traction qualities and dangerous to life and material.

In view of the above the principal object of my invention is to provide an auxiliary power take-off rearwardly positioned, but at a vertical plane considerably above the main take-off and in a plane above the connected ends of the draw bar.

A further object of this invention is to provide an auxiliary elevated power take-off for tractors that permits a speed differential different than the main tractor take-off.

A still further object of my invention is to provide an easily adjustable elevated power take-off that is easily and quickly installed or removed.

A still further object of this invention is to provide an auxiliary power take-off for tractors that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the acompanying drawings, in which:

Fig. 3 is a vertical sectional view of the device taken on line 3—3 of Fig. 2.

Fig. 4 is a cross-sectional view of the power take-off taken on line 4—4 of Fig. 1.

Fig. 5 is a cross-sectional view of the device taken on line 5—5 of Fig. 1.

Figure 1:
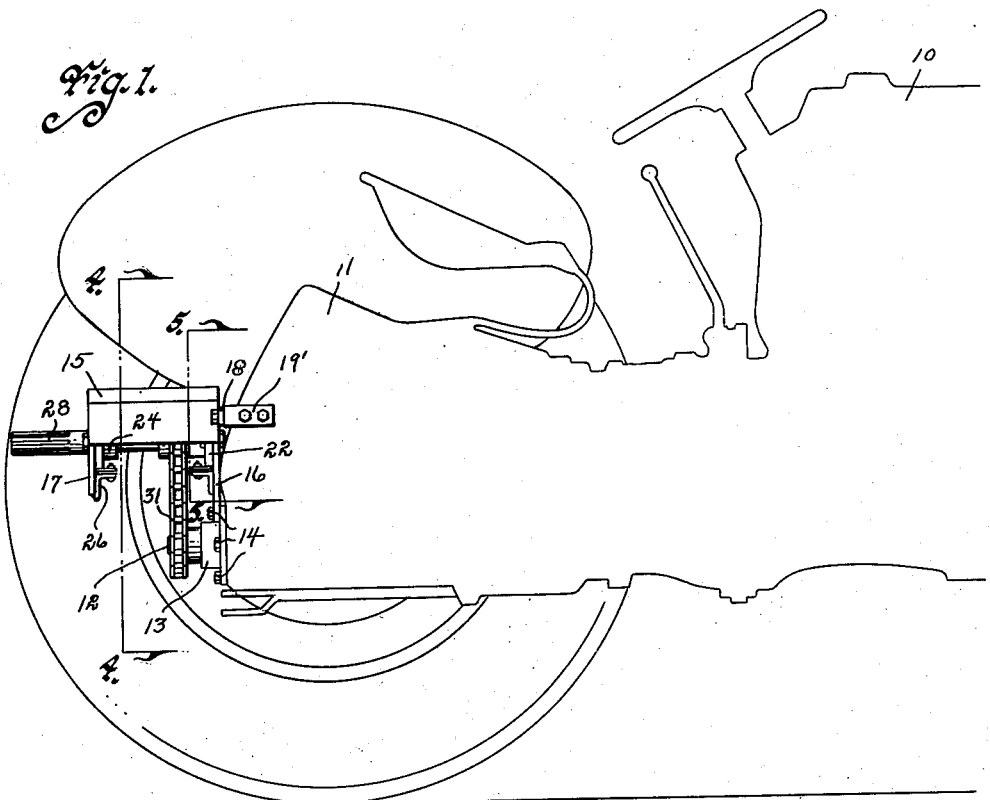
Fig. 1 is a side view of my device installed and ready for use.

Referring to the drawings the numeral 10 designates a tractor having the transmission housing 11 and rearwardly extending main power take-off shaft 12. The numeral 13 designates the outer bearing sleeve of the shaft, held to the tractor by cap screws 14. It is to such a tractor that I apply my invention and which I will now describe in detail. The numeral 15 designates a U-shaped inverted trough housing having its inner end 16 vertically longer than its outer end 17.

Figure 2:
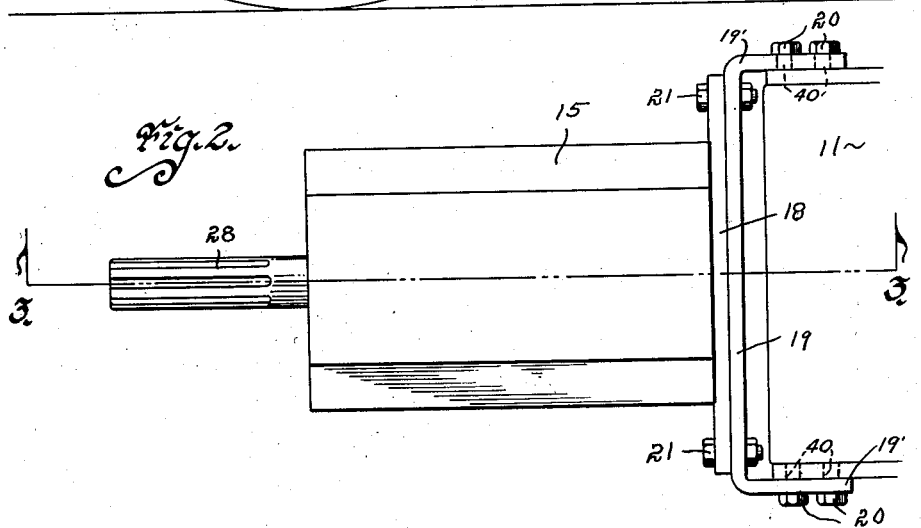
Fig. 2 is a top plan view of my power take-off installed on a tractor.

The numeral 18 designates a horizontal bar secured to the end 16 and extending to each side of the trough housing, as shown in Fig. 2. The numeral 19 designates a horizontal yoke or bracket designed to be permanently secured by its free legs 19' to and around the rear portion of the transmission housing 11, by cap screws 20 extending through holes 40 which have their axes at right angles to the length of said legs 19'. The bar 18 is detachably secured to the yoke 19 by bolts 21. This construction detachably secured the upper portion of the inverted trough housing to the tractor and the lower end of the same is detachably secured to the tractor by extending the top cap screw 14 through the lower portion of the housing end 16, as shown in Fig. 3. With the inverted trough housing so installed it will extend longitudinally of the longitudinal axis of the tractor and parallel and substantially about the main power take-off shaft.

The numeral 22 designates a bearing member vertically adjustable positioned on the upper inside of the end 16. This is accomplished by bolts 23 extending through the end 16 and through vertical slots 41 in the bearing member 22. The numeral 24 designates a like bearing member having vertical slots 42 and positioned on the inside of the end 17, vertically adjustably held by bolts 25 in the same manner as bearing member 22 by bolts 23. To further support the bearing members I have welded a shelf 26 on the inner side of each of the housing ends and under the two bearing members respectively. Shims 27 are used between the bearing members and these shelves. Rotatably mounted in the two bearing members and extending rearwardly through and from the housing 15 is my auxiliary power take-off shaft 28. The numeral 29 designates a sprocket gear on the shaft 28 and inside the housing 15. Any suitable means such as the key 43 secures the sprocket 29 against rotation relative to shaft 28. The numeral 30 designates a sprocket gear on the main power take-off shaft 12. The numeral 31 designates an endless chain embracing the gears 29 and 30. The tightness of this chain is adjustable by moving the bearing members 22 and 24 upwardly or downwardly and then tightening their holding bolts and shims. By changing the relative sizes of the gears 29 and 30, any desired speed of rotation of the shaft 28 to the shaft 12 may be had. Obviously, when the main power take-off is rotating my auxiliary elevated power take-off will be rotated accordingly. By my construction an elevated power take-off will be accomplished, and the same may be attached to the implement in the usual manner. If desired a hood or cover (not shown) may be used to cover the lower portion of the chain, gear 30 and underside of the inverted trough housing.

Some changes may be made in the construction and arrangement of my auxiliary power take-off for tractors without departing from the real spirit and purpose of my invention, and it is my intention to cover by my claims, any modified forms of structure or use of mechanical equivalents which may be reasonably included within their scope.

I claim:

1. In an auxiliary elevated power take-off for use with a tractor having a power take-off shaft, a U-shaped bracket having two free legs; holes in each of said legs, the axes of each of said holes extending laterally of, and at right angles to, the length of said legs, a bearing supporting frame rigidly secured to said U-shaped bracket and having opposing ends and a top secured to said ends, two shelves each rigidly secured to a corresponding inside surface of each of said ends; each of said shelves being vertically spaced from said top of said bearing supporting frame, a pair of bearings each bearing vertically and adjustably secured above a corresponding one of said shelves, shims resting on each of said shelves and supporting the bottom of each of said bearings, a shaft journaled in said bearings, a first sprocket secured to said last named shaft, a chain engaging said first sprocket, a second sprocket secured to said power take-off shaft of the tractor and engaging said chain, and screws extending through holes in the legs of said bracket and engaging the tractor and adapted to secure the bracket to the tractor; said U-shaped bracket secured to said tractor at a point above the power take-off shaft of said tractor.

2. In an auxiliary elevated power take-off for use with tractors having a power take-off shaft, a U-shaped bracket having two free legs; holes in each of said legs, the axis of each of said holes extending laterally of, and at right angles to the length of said legs, a bearing supporting frame rigidly secured to said U-shaped bracket and having opposing ends and a top secured to said ends, two bearing members each positioned on a corresponding inside surface of each end of said bearing supporting frame; each of said bearing members having vertical slots therein; said bearing supporting frame ends having holes therein that align with a portion of the slots in said bearing members, bolts extending through the holes and slots to hold said bearing members in place on said bearing supporting frame ends, means independent of said bolts and rigidly secured to corresponding inside surfaces of each end of said bearing supporting frame to limit solely the downward movement of said bearing members relative to said bearing supporting frame, a shaft journaled in said bearings, a first sprocket gear on said shaft, a chain engaging said first sprocket gear, and a second sprocket gear secured to the power take-off shaft of the tractor and engaging said chain, screws extending through holes in the legs of said bracket and engaging the tractor and adapted to secure the bracket to the tractor at a point above the power take-off shaft of the tractor.

3. In an auxiliary elevated power take-off for use with tractors having a power take-off shaft, a U-shaped bracket having two free legs; holes in each of said legs, the axis of each of said holes extending laterally of, and at right angles to the length of said legs, a bearing supporting frame rigidly secured to said U-shaped bracket and having opposing ends and a top secured to said ends, a pair of bearings positioned on corresponding inside end of said bearing supporting frame, bolts for securing said pair of bearings, said bearing supporting frame having bolt holes therein; said pair of bearings having bolts receiving slots therein at least some of said bolts extending through the slots in said pair of bearings and into the holes in said bearing supporting frame; said bolts adapted to clamping said pair of bearings to the ends of said bearing supporting frame to restrict vertical movement therebetween in at least one direction, means secured to said bearing supporting frame and independent of the bolts extending through slots in said pair of bearings and the holes in said bearing supporting frame to limit vertical movement in at least one direction of said pair of bearings relative to said bearing supporting frame, a shaft journaled in said bearings, a first sprocket gear on said shaft, a chain engaging said first sprocket gear, and a second sprocket gear secured to the power take-off shaft of the tractor and engaging said chain, screws extending through holes in the legs of said bracket and engaging the tractor and adapted to secure the bracket to the tractor at a point above the power take-off shaft of the tractor.

ALFRED E. LARSEN.

REFERENCES CITED

The following references are of record in the file of this patent:

UNITED STATES PATENTS

| Number | Name | Date |
|---|---|---|
| 1,212,593 | Wedge | Jan. 16, 1917 |
| 1,772,247 | Forrester et al. | Aug. 5, 1930 |
| 1,878,662 | Benjamin | Sept. 20, 1932 |
| 1,961,809 | Wood | June 5, 1934 |
| 2,221,751 | Benjamin | Nov. 19, 1940 |
| 2,351,078 | Silver | June 13, 1944 |
| 2,443,035 | Hardy | June 8, 1948 |
| 2,464,059 | Roos et al. | Mar. 8, 1949 |
| 2,494,175 | Hoder, Jr. | Jan. 10, 1950 |